United States Patent
Ban et al.

(10) Patent No.: US 7,687,171 B2
(45) Date of Patent: Mar. 30, 2010

(54) MULTI-STAGE IN-LINE CARTRIDGE EJECTOR FOR FUEL CELL SYSTEM

(75) Inventors: Hyeon Seok Ban, Gyeonggi-do (KR); Hae Weon Lee, Gyeonggi-do (KR); Yong Gyu Noh, Gyeonggi-do (KR); Yong Sun Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/156,195

(22) Filed: May 29, 2008

(65) Prior Publication Data
US 2009/0155668 A1  Jun. 18, 2009

(30) Foreign Application Priority Data
Dec. 13, 2007   (KR) .................. 10-2007-0130107

(51) Int. Cl.
| | |
|---|---|
| H01M 8/04 | (2006.01) |
| H01M 8/12 | (2006.01) |
| H01M 2/00 | (2006.01) |
| H01M 2/02 | (2006.01) |
| H01M 2/14 | (2006.01) |
| G05D 11/00 | (2006.01) |
| F16K 15/00 | (2006.01) |
| F16K 17/00 | (2006.01) |
| F16K 21/04 | (2006.01) |

(52) U.S. Cl. ....................... 429/25; 429/34; 429/38; 429/39; 137/111; 137/114; 137/512

(58) Field of Classification Search ............ 429/34, 429/25; 137/111, 114
See application file for complete search history.

(56) References Cited

U.S. PATENT DOCUMENTS 4,255,121 A * 3/1981 Sugimoto .................. 431/208

6,706,438 B2 * 3/2004 Sahoda et al. ............... 429/34
7,037,609 B2   5/2006 Sugawara et al.

(Continued)

FOREIGN PATENT DOCUMENTS

JP       2004-178843      6/2004

(Continued)

*Primary Examiner*—Jerry Lorengo
*Assistant Examiner*—Eli Mekhlin
(74) *Attorney, Agent, or Firm*—Edwards Angell Palmer & Dodge LLP; Peter F. Corless

(57) ABSTRACT

Multi-stage in-line cartridge ejectors for a fuel cell system provided herein comprise: at least one ejector main body for supplying hydrogen, each ejector main body including a plurality of nozzles arranged in line with a predetermined gap, in which the diameters of the respective nozzles become larger from an inlet side of the ejector main body toward an outlet side thereof, and a plurality of sub-inlets formed on an outer surface of the ejector main body to be connected to the gap or gaps between the nozzles; and a housing accommodating the eject main body and including a main inlet for intake of recirculated hydrogen. The multi-stage in-line cartridge ejectors can improve the system performance by increasing the amount of recirculated hydrogen. Moreover, at least one check valve is provided at an intake position of the cartridge ejectors to effectively prevent reverse flow of recirculation hydrogen gas and at least one heater is provided around the cartridge ejectors to improve cold startability.

6 Claims, 3 Drawing Sheets

U.S. PATENT DOCUMENTS

| | | |
|---|---|---|
| 7,105,243 B2 | 9/2006 | Morishima et al. |
| 7,157,174 B2 | 1/2007 | Morishima et al. |
| 2003/0129472 A1* | 7/2003 | Fukuma et al. ............... 429/34 |
| 2007/0062746 A1* | 3/2007 | Yamamoto et al. ......... 180/65.3 |
| 2008/0199746 A1* | 8/2008 | Kobayashi et al. ............ 429/25 |

FOREIGN PATENT DOCUMENTS

| | | |
|---|---|---|
| KR | 10-2004-0091685 | 10/2004 |
| KR | 10-2006-0070090 | 6/2006 |
| WO | WO 2005117181 A1 * | 12/2005 |

* cited by examiner

MULTI-STAGE IN-LINE CARTRIDGE EJECTOR FOR FUEL CELL SYSTEM

CROSS-REFERENCE TO RELATED APPLICATION

This application claims under 35 U.S.C. §119(a) the benefit of Korean Patent Application No. 10-2007-0130107 filed Dec. 13, 2007, the entire contents of which are incorporated herein by reference.

BACKGROUND (a) Technical Field

The present invention relates to a multi-stage in-line cartridge ejector. More particularly, the present invention relates to a multi-stage in-line cartridge ejector for a fuel cell system, which serves as a hydrogen recirculation blower of a fuel processing system in a fuel cell system to increase the amount of recirculated hydrogen, thus improving the system performance.

(b) Background Art

In general, a fuel cell is capable of producing a direct current by converting chemical energy of a fuel gas directly into electrical energy. Unlike other conventional batteries, the fuel cell generates electricity continuously by utilizing fuel and air supplied from the outside.

Hydrogen used as a fuel in the fuel cell may be pure hydrogen or reformed hydrogen generated by a reforming process using a hydrocarbon such as methane or ethanol.

Recently, the fuel cells have been applied to vehicles, and extensive research and development aimed at development of fuel cell vehicles have continued to progress. Such fuel cell vehicles have the same characteristics as electric vehicles and there is no fundamental difference, except that the fuel cell vehicles are more environment-friendly and can use pure hydrogen or reformed hydrogen as an energy source to generate electrical energy.

In a fuel cell system using hydrogen as a fuel, hydrogen is supplied from a hydrogen tank to a fuel cell stack and the amount of hydrogen gas supplied to the fuel cell stack is controlled by a controller. Meanwhile, air used in the fuel cell is supplied to the fuel cell stack through a compressor.

Usually, the air and hydrogen are supplied to the fuel cell in an amount larger than the amount required for electrochemical reaction in order to ensure a certain level of the performance of the fuel cell stack and increase the lifespan thereof.

Unreacted hydrogen remaining in the fuel cell stack is recirculated to prevent waste of fuel, thus increasing the overall efficiency of the system.

Especially, the technique for recirculating the unreacted hydrogen is crucial to improve fuel efficiency of the fuel cell system. A blower means has been typically used to recirculate the unreacted hydrogen discharged from the fuel cell stack to a stack inlet.

Since conventional blower means has several drawbacks in that it has a complex structure, requires lubrication, and causes noise and vibration, techniques to recirculate the unreacted hydrogen using an ejector means have been proposed.

The ejector means for hydrogen recirculation has advantages in that it has a simpler structure than that of the blower means, it does not require lubrication since rotational elements are not used therein, and it does not cause noise and vibration; however, there is also a problem in that the ejector means has a narrow operation range and thus it is not suitable to apply it to the fuel cell vehicle in which the load is rapidly changed.

In order to solve such drawbacks, there have been various approaches to widen the operation range of the ejector means. One approach was to use a plurality of ejectors to increase the operation range, as proposed by some Japanese vehicle manufacturers.

However, this approach has some drawbacks in that the plurality of ejectors occupy much space in a vehicle, manufacturing costs increase due to increased number of parts, flux control of the ejectors is not sufficiently accurate due to the difficulty in manipulation of a hydraulically driven needle used therein.

Further, the approach is disadvantageous in that since two or three ejectors are interchanged or switched additional elements such as a device for interchanging or switching the ejectors and a device for preventing reverse flow, thereby inviting a complexity of the structure.

As another example of the ejector means, there is a variable nozzle type ejector in which the position of a needle is controlled by an electric motor means to adjust the pressure and amount of hydrogen gas. However, it has several drawbacks in that it is expensive and it encounters a pressure loss or leakage problem.

The information disclosed in the Background section is only for enhancement of understanding of the background of the invention and should not be taken as an acknowledgement or any form of suggestion that this information forms the prior art that is already known to a person skilled in the art.

SUMMARY OF THE DISCLOSURE

The present invention has been made in an effort to solve the above-described problems associated with prior art. One object of the present invention is to provide a multi-stage in-line cartridge ejector for a fuel processing system in a fuel cell system, which can improve the system performance by increasing the amount of recirculated hydrogen.

Another object of the present invention is to provide a multi-stage in-line cartridge ejector which can effectively prevent reverse flow of recirculation hydrogen gas and improve cold startability.

In one aspect, the present invention provides a multi-stage in-line cartridge ejector for a fuel cell system, characterized in that the multi-stage in-line cartridge ejector having an amplification structure which increases the amount of flow continuously in respective stages is provided between a hydrogen tank and a fuel cell stack of the fuel cell system and, and at the same time, connected to a hydrogen recirculation line so as to increase the amount of recirculation gas from the hydrogen recirculation line using a high pressure flow of hydrogen supplied to the fuel cell stack via the multi-stage in-line cartridge ejector.

In a preferred embodiment, the multi-stage in-line cartridge ejector comprises at least one ejector main body for supplying hydrogen, each ejector main body including a plurality of nozzles arranged in line with a predetermined gap, in which the diameters of the respective nozzles become larger from an inlet side of the ejector main body toward an outlet side thereof, and a plurality of sub-inlets formed on an outer surface of the ejector main body to be connected to the gap or gaps between the nozzles; and a housing accommodating the eject main body and including a main inlet for intake of recirculated hydrogen.

Preferably, at least two ejector main bodies are arranged in parallel in the housing.

Also preferably, the sub-inlets of the ejector main body are positioned in a front portion of the gap or gaps between the nozzles.

Suitably, a plurality of check valves for preventing reverse flow of the hydrogen recirculation line are provided on the sub-inlets of the ejector main body.

Also suitably, a heater for improving cold startability is provided on an outside of the housing.

Preferably, each of the ejector main bodies includes three nozzles arranged in line with a predetermined gap and three sub-inlets formed on an outer surface of the ejector main body to be connected to the gaps between the nozzles.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
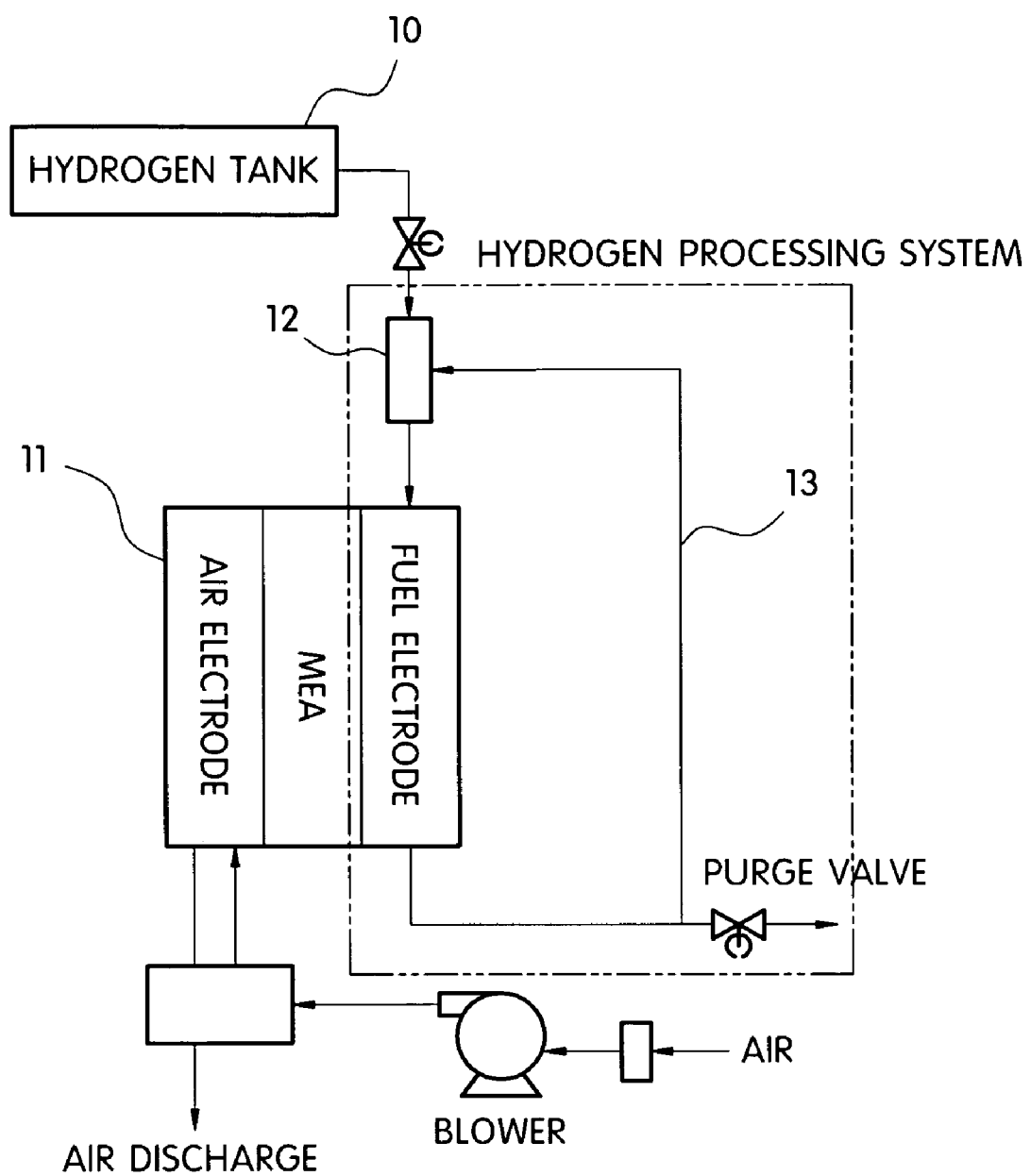
FIG. 1 is a schematic view showing a fuel processing system in which a multi-stage in-line cartridge ejector in accordance with a preferred embodiment of the present invention is provided.

Reference numerals set forth in the Drawings includes reference to the following elements as further discussed below:

| | |
|---|---|
| 10: hydrogen tank | 11: fuel cell stack |
| 12: multi-stage in-line cartridge ejector | |
| 13: hydrogen recirculation line | |
| 14: main inlet | 15: ejector main body |
| 16: housing | 17a, 17b and 17c: nozzles |
| 18a, 18b and 18c: sub-inlets | 19a, 19b and 19c: check valves |
| 20: heater | 21: stack block |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

FIG. 1 is a schematic view showing a fuel processing system in which a multi-stage in-line cartridge ejector in accordance with a preferred embodiment of the present invention is provided.

As shown in FIG. 1, a fuel processing system (FPS), i.e., a hydrogen supply system, supplies hydrogen from a compressed hydrogen tank 10 to a fuel cell stack 11, and controls the operation of the overall fuel cell system. The FPS includes a low pressure regulator, a multi-stage in-line cartridge ejector 12, various sensors, etc.

The multi-stage in-line cartridge ejector 12 is disposed between the hydrogen tank 10 and the fuel cell stack 11 and, at the same time, connected to a hydrogen recirculation line 13. The multi-stage in-line cartridge ejector 12 creates vacuum by supplying compressed hydrogen from the compressed hydrogen tank 10 through a nozzle and recirculates the hydrogen gas in a fuel electrode of the fuel cell stack 11 by using the vacuum.

Accordingly, the amount of hydrogen gas introduced from the hydrogen recirculation line 13 may be increased by the high pressure flow of hydrogen supplied to the fuel cell stack 11 via the multi-stage in-line cartridge ejector 12.

The fuel cell stack 11 is a power generation module of the fuel cell, which generates electricity through an electrochemical reaction between air and hydrogen. The fuel cell stack 11 includes an air electrode, a fuel electrode, a membrane electrode assembly (MEA), a coolant flow field, and the like.

Here, the hydrogen recirculation line 13, i.e., the recirculation line of the fuel electrode, facilitates the water discharge from the fuel cell stack 11 and humidifies the hydrogen, which affects the stability and efficiency of the overall system.

In principle, more recirculation amount gives more advantages to the system.

A purge valve is provided at an outlet side of the fuel electrode. The purge valve is opened and closed by a command of a system controller in order to control the hydrogen concentration in an FPS pipe.

Preferably, an orifice may be attached to a rear end of the purge valve and the discharged hydrogen may be diluted to a concentration of 5% or less by a dilution device.

Figure 2:
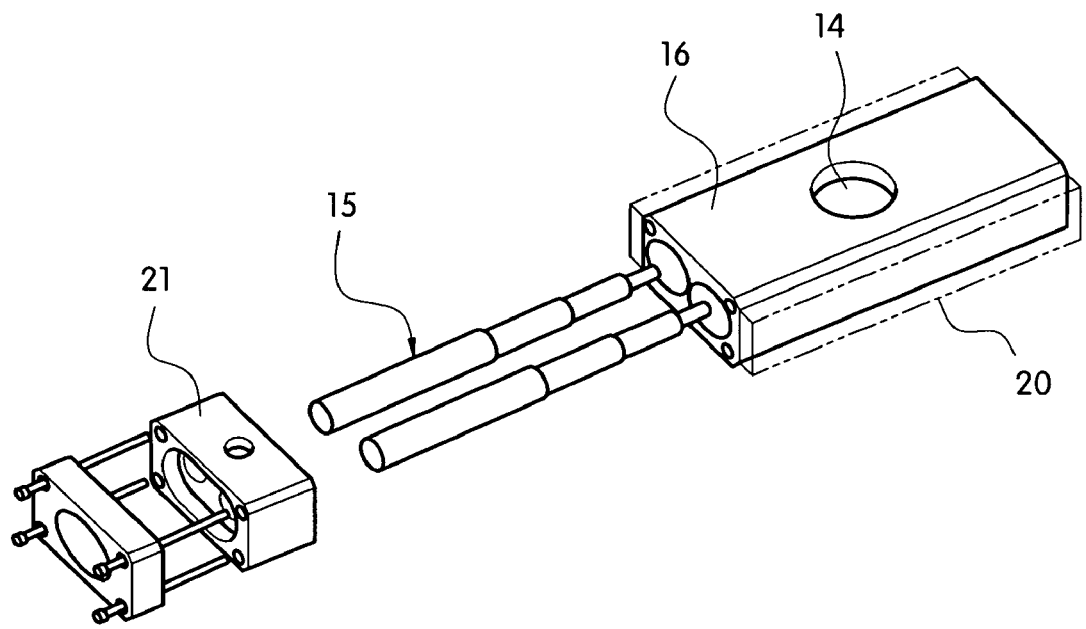
FIG. 2 is a perspective view showing component parts of the multi-stage in-line cartridge ejector in accordance with the preferred embodiment of the present invention and peripheral parts.

FIG. 2 is a perspective view showing component parts of the multi-stage in-line cartridge ejector in accordance with the preferred embodiment of the present invention and peripheral parts.

As shown in FIG. 2, the multi-stage in-line cartridge ejector 12 includes an ejector main body 15 and a housing 16 accommodating the same.

The ejector main body 15 accommodated inside the housing 16 is connected to a stack block 21 of the fuel cell stack 11. The compressed hydrogen gas passes through the ejector main body 15 and is then supplied to the fuel cell stack 11 through the stack block 21.

Preferably, one ejector main body 15 may be arranged in the housing 16. More preferably, at least two ejector main bodies 15 may be arranged in the housing 16, The housing 16 made of, for example, a metal material includes a main inlet 14 for the inflow of recirculated hydrogen. A heater 20 is provided on an outer portion of the housing 16 to shorten the cold-start time. Although the type of the heater is not limited, a silicon rubber heater may be used.

Figure 3:
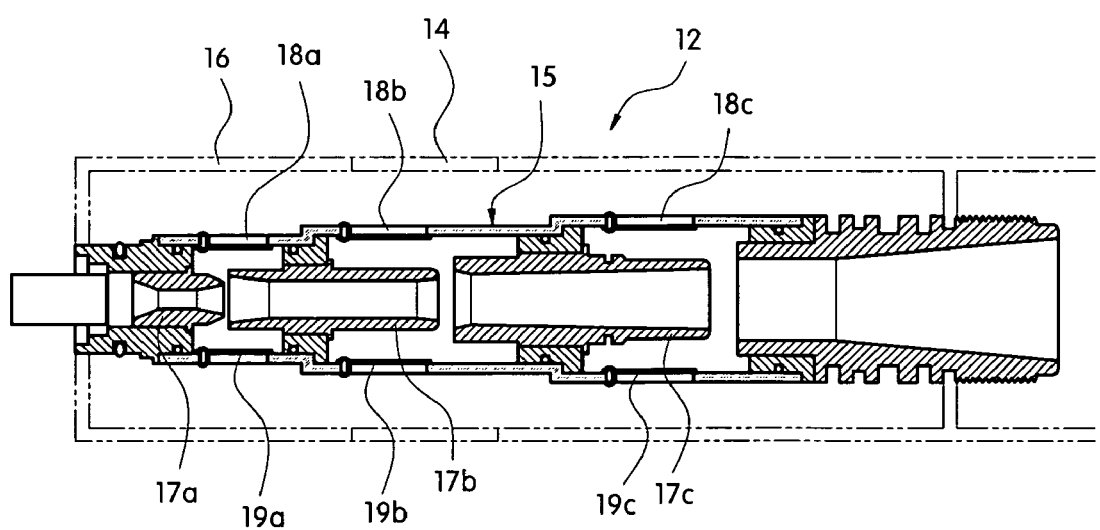
FIG. 3 is a cross-sectional view showing the structure of the multi-stage in-line cartridge ejector in accordance with the preferred embodiment of the present invention.

FIG. 3 is a cross-sectional view showing the structure of the multi-stage in-line cartridge ejector in accordance with the preferred embodiment of the present invention.

As shown in FIG. 3, the ejector main body 15 makes a high speed jet stream through a multi-stage nozzle and creates vacuum using the same, thus introducing a mixed gas of recirculated hydrogen at high temperature and humidity.

The ejector main body 15 may, preferably, include two or more nozzles. In a preferred embodiment, as shown in FIG. 3, three nozzles 17a, 17b and 17c are arranged in line with a predetermined gap inside the ejector main body 15 to form a concentric circle with respect to the ejector main body 15.

The diameters of the respective nozzles 17a, 17b and 17c become larger in the arrangement order from an inlet side connected to the hydrogen tank 10 to an outlet side connected to the fuel cell stack 11.

For example, the diameter of the second-stage nozzle 17b is greater than that of the first-stage nozzle 17a, and the diameter of the third-stage nozzle 17c is greater than that of the second-stage nozzle 17b.

In addition, the ejector main body 15 may, preferably, include two or more sub-inlets. As shown in FIG. 3, for example, three sub-inlets 18a, 18b and 18c are provided on an outer surface of the ejector main body 15 to be connected to gap spaces between the nozzles 17a, 17b and 17c. Accordingly, the hydrogen introduced through the sub-inlets 18a, 18b and 18c may be absorbed to the gap spaces by the air stream flowing along an axial line of the nozzles.

In this case, the respective sub-inlets 18a, 18b and 18c are positioned in a front portion of the gap spaces between the respective nozzles 17a, 17b and 17c to provide passages through which the introduced hydrogen may naturally proceed toward the gap spaces.

Suitably, at least one check valve may be provided to prevent reverse flow of the hydrogen recirculation line 13. As shown in FIG. 3, for example, three check valves 19a, 19b and 19c are provided on the respective sub-inlets 18a, 18b and 18c to prevent reverse flow of the hydrogen recirculation line 13.

The purge valve provided in the fuel process system is an on-off valve which discharges to atmosphere the nitrogen or other by-products contained in the gas discharged from a stack outlet, thus optimizing the properties of the recirculated gas. During purging operation, nitrogen, hydrogen, steam, water, etc. are discharged, and the on-off interval and the opening time are adjusted according to an applied load.

If the ejector for recirculating the gas does not perform properly, where the purge valve is opened, the hydrogen is not supplied to the stack but flows backward to the recirculation line and may then be discharged to atmosphere through the purge valve.

In terms of the properties of the ejector, the ejector shows a high performance when a large amount of recirculated gas is supplied while there is little absorption function in the recirculation line when a small amount of recirculated gas is supplied (for example, during idling and low load operation).

Accordingly, a means for preventing the reverse flow of the hydrogen recirculation line 13 such as a check valve is necessary.

In the preferred embodiment of the present invention, the check valves 19a, 19b and 19c each in the form of a round (shell-type) plate are mounted in the sub-inlets 18a, 18b and 18c so as to prevent the hydrogen from flowing backward to the recirculation line when there is no absorption function.

Commercially available check valves have some drawbacks in that they have a large volume, a large pressure drop, and difficulties in connecting pipes. The check valve provided by the present invention, however, is directly mounted on the respective inlets and directly reacts against the pressure of the nozzle.

When vacuum is created by the nozzle, the shell-type plate is pushed toward the center of the ejector to create a gap, thus opening the inlet. Whereas, when vacuum is not created by the nozzle, the shell-type plate blocks the inlet to prevent the reverse flow of the gas.

Figure 4:
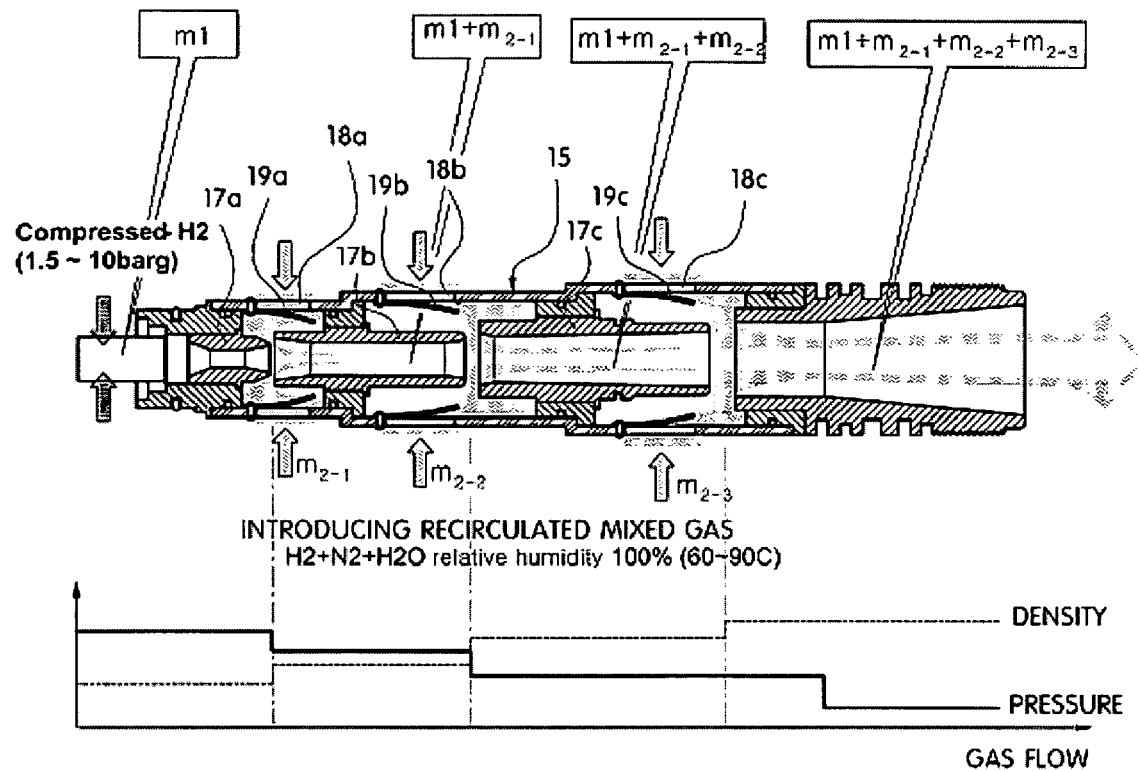
FIG. 4 is a cross-sectional view showing the operation state of the multi-stage in-line cartridge ejector in accordance with the preferred embodiment of the present invention.

FIG. 4 is a cross-sectional view showing the operation state of the multi-stage in-line cartridge ejector in accordance with the preferred embodiment of the present invention.

As shown in FIG. 4, the multi-stage in-line cartridge ejector according to the preferred embodiments of the present invention increases the amount of flow continuously in the respective stages. In detail, (1) dry hydrogen at a high pressure of about 1.5 to 10 bar is injected from the first-stage nozzle 17a at high speed; (2) the injected hydrogen creates vacuum (low pressure) in the first-stage nozzle portion, and a mixed gas of hydrogen, nitrogen, steam, etc. is introduced into the first-stage sub-inlet 18a; (3) the gas density in the first stage is increased by the introduced nitrogen and steam, and thereby a higher vacuum pressure is created in the second-stage nozzle 17b; (4) the gas passing through the first-stage having a still higher pressure is reinjected through the second-stage nozzle 17b to create a low pressure, and the recirculated gas is introduced to the second-stage sub-inlet 18b; (5) a much higher vacuum pressure is created, in the same manner, in the third stage by the third-stage nozzle 17c and the recirculated gas is introduced to the third-stage sub-inlet 18c; (6) the above processes (1) to (5) are repeated in the respective stages. In principle, more stages will increase the amount of introduced gas.

In general, since the intake (absorption) performance is proportional to the flow velocity and density in the nozzle, the intake performance of the ejector can be improved by increasing the density of the gas in the respective stages towards the outlet.

The multi-stage in-line cartridge ejector of the preferred embodiments of the present invention has a closed loop in which vacuum is created using a high pressure hydrogen, the fuel is supplied to the stack inlet, and the unreacted fuel is introduced to the ejector inlet. Also, it is possible to easily obtain a sufficient vacuum pressure and a large amount of flow using the multi-stage in-line nozzle in accordance with the present invention. Moreover, at least one cartridge ejector may be mounted in parallel to provide a multi-type ejector. Accordingly, it is possible to add a plurality of cartridge ejectors in a single ejector housing to meet the load required by the system, thus obtaining a high vacuum pressure and a large amount of flow with a small volume.

As described above, according to the multi-stage in-line cartridge ejector the amount of recirculated hydrogen can be increased and the overall performance of the system can be improved. Moreover, the number of parts and the manufacturing cost can be significantly reduced compared with the conventional blower system. Furthermore, the high-price motor and controller used in the conventional ejector are not required. Also, the possibility of malfunctions and noise can be reduced. In addition, the assembly, maintenance and repair of the ejector can be simplified. Additionally, the cold-start time can be shortened, thus improving the cold startability.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A multi-stage in-line cartridge ejector for a fuel cell system, the ejector being positioned between a hydrogen tank and a fuel cell stack, the ejector comprising:

at least one ejector main body for supplying hydrogen, each ejector main body comprising a plurality of nozzles arranged in line with a predetermined gap, in which the diameters of the respective nozzles become larger from an inlet side of the ejector main body toward an outlet side thereof, and a plurality of sub-inlets formed on an outer surface of the ejector main body to be connected to the gap or gaps between the nozzles; and a housing accommodating the ejector main body, the housing including a main inlet for intake of recirculated hydrogen, through which the ejector main body is in fluid communication with a hydrogen recirculation line, whereby the recirculated hydrogen gas is introduced into the ejector main body via sub-inlets when a high pressure flow of hydrogen passes through an in-line nozzle, wherein the inline nozzles are configured to inject fluid through one another as the fluid progresses from the inlet of the ejector to the outlet, whereby the amount of flow gradually increases while passing through the injector.

2. The multi-stage in-line cartridge ejector of claim 1, wherein at least two ejector main bodies are arranged in parallel in the housing.

3. The multi-stage in-line cartridge ejector of claim 1, wherein the sub-inlets of the ejector main body are positioned in a front portion of the gap or gaps between the nozzles.

4. The multi-stage in-line cartridge ejector of claim 1, wherein a plurality of check valves for preventing reverse flow of the hydrogen recirculation line are provided on the sub-inlets of the ejector main body.

5. The multi-stage in-line cartridge ejector of claim 1 wherein a heater for improving cold startability is provided on an outside of the housing.

6. The multi-stage in-line cartridge ejector of claim 1 wherein each of the ejector main bodies includes three nozzles arranged in line with a predetermined gap and three sub-inlets formed on an outer surface of the ejector main body to be connected to the gaps between the nozzles.

* * * * *